(12) United States Patent
Korzeniowski

(10) Patent No.: US 8,597,507 B2
(45) Date of Patent: Dec. 3, 2013

(54) SUPER OXIDATION, COAGULATION AND FLOCCULATION SYSTEM FOR TREATMENT OF WATER AND WASTEWATER

(76) Inventor: Jan A. Korzeniowski, Calgary (CA)

( * ) Notice: Subject to any disclaimer, the term of this patent is extended or adjusted under 35 U.S.C. 154(b) by 194 days.

(21) Appl. No.: 12/427,572

(22) Filed: Apr. 21, 2009

(65) Prior Publication Data

US 2010/0264075 A1 Oct. 21, 2010

(51) Int. Cl.
*B01D 19/00* (2006.01)
*B01D 21/01* (2006.01)
*C02F 1/78* (2006.01)

(52) U.S. Cl.
USPC ............ 210/188; 210/195.1; 210/195.3; 210/205; 210/220; 210/258; 210/259

(58) Field of Classification Search
USPC ......... 210/702, 718, 721, 722, 749, 759, 760, 210/188, 195.1, 195.3, 192, 198.1, 205, 210/207, 220, 258, 259; 261/DIG. 42
See application file for complete search history.

(56) References Cited

U.S. PATENT DOCUMENTS

| | | | | |
|---|---|---|---|---|
| 4,133,759 A | * | 1/1979 | Ikeda et al. | 210/104 |
| 5,273,664 A | * | 12/1993 | Schulz | 210/760 |
| 5,516,434 A | * | 5/1996 | Cairo et al. | 210/196 |
| 5,560,831 A | * | 10/1996 | Bladen et al. | 210/704 |
| 5,578,205 A | * | 11/1996 | Martin | 210/205 |
| 5,711,887 A | * | 1/1998 | Gastman et al. | 210/760 |

* cited by examiner

*Primary Examiner* — Lucas Stelling

(57) ABSTRACT

The super oxidation, coagulation and flocculation system is applicable to water and wastewater chemical treatment in which oxidation, coagulation and flocculation processes take place in a single vessel.

The apparatus and process can be used for treatment of domestic and industrial water and wastewater for removal of organic and inorganic contaminants.

The oxidation process can be provided by several oxidizing chemicals such as ozone, hydrogen peroxide, potassium permanganate, chlorine and Ultra Violet Lights, and the coagulation process can be accomplished with several coagulants such as aluminum sulphide, ferric chloride, ferric sulphate.

Selection of the chemicals depends on the quality of the water or wastewater to be treated and the treated water quality required, and it covers a wide range of impurities to be removed and specifically difficult to oxidize hydrocarbons and chlorinated organics, and iron, manganese, uranium, arsenic, cyanide, hydrogen sulphide.

The apparatus and the process are economical and have a small installation footprint as several processes take place in a single vessel.

20 Claims, 2 Drawing Sheets

SUPER OXIDATION, COAGULATION AND FLOCCULATION SYSTEM FOR TREATMENT OF WATER AND WASTEWATER

FIELD OF THE INVENTION

The invention relates to a process and apparatus for chemical treatment of water and wastewater with oxidation, combined with coagulation and flocculation processes.

BACKGROUND OF THE INVENTION

A variety of water and wastewater treatment systems involving oxidation, coagulation and flocculation processes require several vessels, large foot print, and complex mechanical, electrical and instrumentation control systems.

The super oxidation system with ozonation involves high pressure ozonators which are expensive and not safe to operate due to the ozone being supplied under a high pressure. The ozone and water mixing takes place in an ozonation vessel and the ozone is dispersed in the vessel through diffusers which have very small pores to produce very small ozonated air bubbles. The diffusers are subject to plugging with water or wastewater precipitates and are difficult and costly to replace, and the diffuser replacement requires a shut down of the oxidation system.

The efficiency of the ozone solution in the water or wastewater is dependent mainly on the ozonated air bubble size and the height of the ozonation vessel.

The smaller the ozonated air bubbles and the higher the ozonation vessel, the higher the ozone solution in the water or wastewater.

The present invention employs a different process and device for mixing water with ozone which primarily takes place outside of the ozonation vessel. The present invention can employ multiple ozone and water mixing systems which facilitate maintenance, replacement and repairs without shutting down the oxidation system. Also, the multiple ozone and water mixing systems are suitable to varying flow rates and quality of the inlet water.

The present invention ensures a superior mixing of ozone and water and the efficiency of the ozone solution in water is not dependent on the ozonation vessel height. The present invention employs vacuum type ozone generators which are less expensive and safer to operate than the pressure type ozone generators.

BRIEF SUMMARY OF THE INVENTION

The treatment system of the present invention is a process and apparatus for chemical treatment of water and wastewater containing inorganic and organic contaminants such as dissolved iron, manganese, arsenic, uranium, cyanide, hydrogen sulphide, naturally occurring organics, hydrocarbons and chlorinated organics.

The treatment system is specifically suited for removal of difficult to oxidize and remove organics, hydrocarbons and chlorinated organic compounds.

The treatment system can be operated as a super oxidation process alone or in combination with coagulation and flocculation processes accomplished in the same vessel as shown on FIG. 1 and FIG. 2.

The treatment system as shown on FIG. 1 comprises the following major components:
Raw water inlet piping.
Oxidation system with ozonation alone or ozonation with hydrogen peroxide.
Oxidation, coagulation and flocculation vessel.
Coagulation and flocculation system.
Treated water outlet piping and off gas discharge piping.

The treatment system can be supplemented with other treatment processes including settling, dissolved air flotation and/or filtration.

The inlet water piping system is located at the bottom of the oxidation vessel and it preferably includes a strainer with an automatic flushing system, to remove coarse suspended solids of approximately 2 mmØ and larger, and a flow meter to monitor the inlet water flow rate and volume, and to pace dosage of oxidizing chemicals such as ozone and hydrogen peroxide, and a coagulation chemical, if required.

The oxidation system comprises a recirculation pump, an ozone supply system c/w J. K. patented air aspirator-mixer, hydrogen peroxide supply and mixing system c/w an in-line mixing chamber for mixing the inlet water with hydrogen peroxide before the inlet water and hydrogen peroxide are mixed with ozone in the air aspirator-mixer.

The oxidation recirculation pump flow rate is preferably approximately equal, within 10-20%, of the inlet raw water flow rate, although higher and lower recirculation flow rates can be used.

The oxidation vessel is vertical and preferably round or square or rectangular in horizontal cross section and having a height of preferably three to five times the largest cross section dimension, and fixed bottom base, and removable top cover and air tight construction of corrosion resistant materials.

The treated water outlet piping is located at the top of the oxidation vessel and it is arranged such to maintain a designated water level in the vessel and to prevent the ozone off gas escaping into the atmosphere, by-passing an ozone destruction unit.

The ozone off gas discharge system comprises piping which collects the ozone off gas from the top of the oxidation vessel and from the treated water outlet piping, and an ozone destruction unit, and an air outlet piping to the atmosphere.

The ozone off gas can be recycled to the air aspirator-mixer before it passes through the ozone destruct unit.

The coagulation system comprises a recirculation pump, a coagulant supply system, an initial, a low hydraulic gradient mixing vessel and a high hydraulic gradient static mixer for mixing the coagulant with the water, and inlet and outlet piping system which connects the coagulation system with the oxidation vessel.

The coagulation recirculation pump flow rate is preferably the same or within 10 to 20%±of the inlet raw water flow rate.

The treatment system as shown on FIG. 2 is an economic and compact revision of the system shown on FIG. 1 and it comprises the same major components of the raw water inlet piping, the oxidation vessel and the treated water outlet piping and the off gas discharge piping.

The oxidation and coagulation systems are combined together and they are accomplished by means of the same recirculation pump by splitting the pump discharge flow into two separate oxidation and coagulation streams.

The recirculation pump flow rate is approximately twice the inlet raw water flow rate and the oxidation and coagulation streams flow rates are approximately equal.

BRIEF DESCRIPTION OF THE SEVERAL VIEWS OF THE DRAWING

Having thus generally described the invention, it will be referred to more specifically by reference to accompanying drawings illustrating preferred embodiments, and in which.

DETAILED DESCRIPTION OF THE INVENTION

Figure 1:
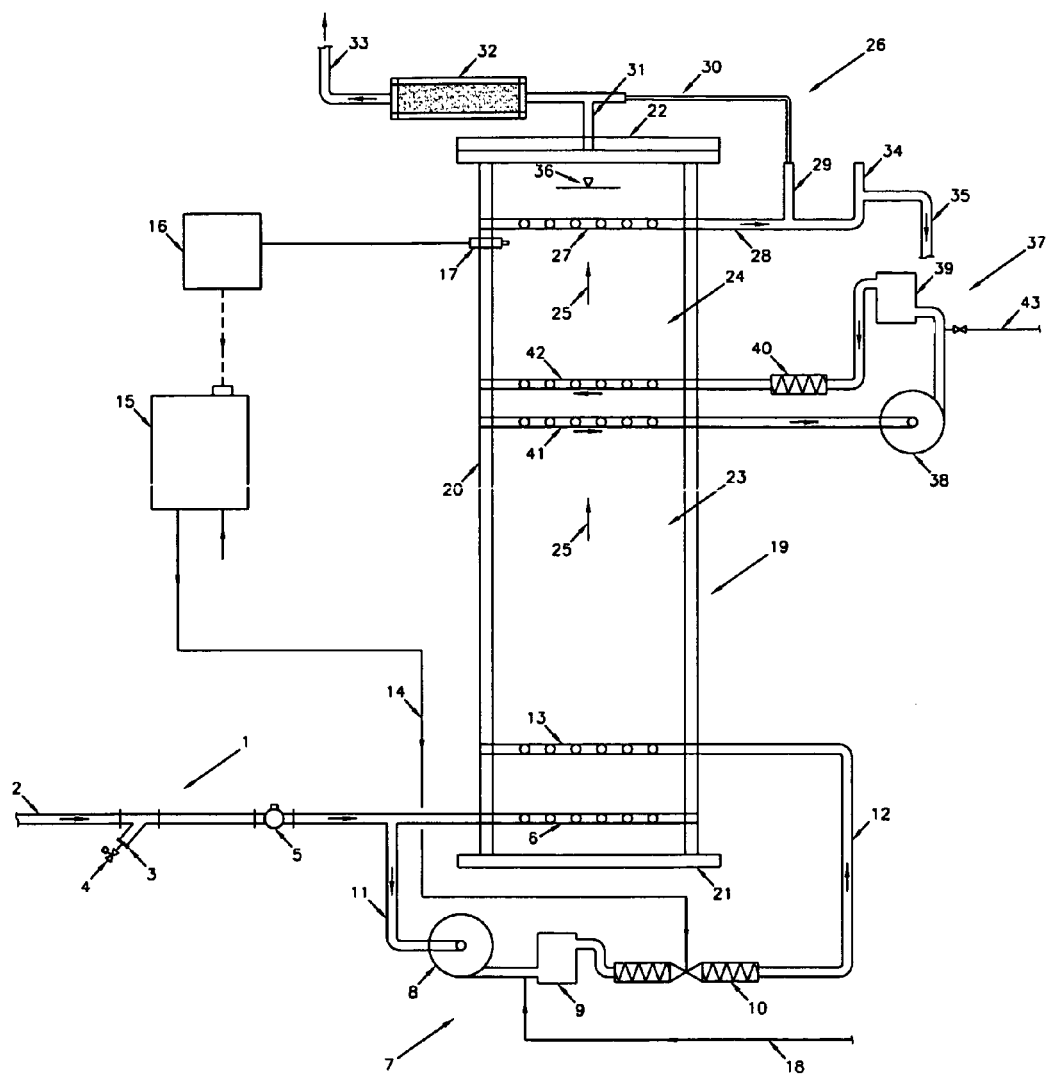
FIG. 1 is a diagrammatic illustration in vertical cross-section of the treatment process and apparatus, in which the oxidation, coagulation and flocculation processes take place in a single vessel and the oxidation and the coagulation and flocculation processes are provided by separate systems.

According to the embodiment of the invention, as shown on FIG. 1, the treatment system comprises the following major components: a raw water inlet piping 1, an oxidation system 7, an oxidation, coagulation and flocculation vessel 19, a treated water outlet and off gas discharge piping 26, a coagulation and flocculation system 37.

The raw water inlet piping 1, comprises a raw water inlet pipe 2, a strainer 3 with an automatic flushing valve 4, a flow meter 5 and a discharge pipe 6. The discharge pipe 6 is preferably slotted or perforated to provide a uniform distribution of the wastewater in the oxidation vessel 19.

The oxidation system 7 comprises an oxidation recirculation pump 8, an initial chemical mixing chamber 9, an air (ozone) aspirator-mixer 10, an inlet pipe 11, and outlet pipe 12, a discharge pipe 13, an ozone generator 15 and a hydrogen peroxide or other chemical supply 18.

Preferably the ozone generator 15 is provided with an ozone in water monitor 16 and an ozone in water sensor 17.

The oxidation recirculation pump 8 takes water from the raw water inlet piping 1, and pumps the raw water through the chemical mixing chamber 8, the air (ozone) aspirator-mixer 10, into the outlet pipe 12 and the discharge pipe 13.

The air (ozone) aspirator-mixer 10, aspires ozonated air from the ozone generator 15 when the recirculation pump 8 pumps the raw water through the air (ozone) aspirator-mixer 10.

The recirculation pump 8 inlet pipe 11 connection to the raw water inlet pipe 2 and the raw water outlet pipe 6 eliminates a need for a precise control and adjustment of the recirculation pump 8 flow rate to match the raw water inlet flow rate.

The raw water can flow from the raw water inlet pipe 2 into the recirculation pump 8 and into the oxidation vessel 19 and the water can flow into the circulation pump 8 from the raw water inlet pipe 2 and from the oxidation vessel 19 in various proportions to satisfy the recirculation pump 8 flow rate.

The chemical mixing chamber 9 is provided to thoroughly mix hydrogen peroxide, or other oxidizing chemical, with the raw water before the mixture is mixed with ozone.

The chemical supply 18 is connected upstream of the initial chemical mixing chamber 9.

The ozone in water monitor 16 and the ozone in water sensor 17 are provided to adjust the ozone dosage from the ozone generator 15 in order to maintain a desired ozone residual in the treated water before it leaves the treatment system.

The oxidation and coagulation and flocculation vessel 19 comprises a cylindrical or square or rectangular shell 20, a fixed bottom cover 21, and a removable top cover 22 which provides access to the vessel for installation, inspection and repairs of the components contained inside the vessel 19.

The vessel 19 functions as an oxidation vessel in its lower part 23 and a flocculation vessel in its upper part 24.

The treated water outlet and off gas discharge piping 26 comprises a treated water outlet inside pipe 27 which is preferably perforated or slotted on the top, an outlet outside pipe 28, vent pipes 29 & 30, a siphon breaker pipe 34 and a discharge pipe 35, and an off gas outlet pipe 31, an ozone destruct unit 32 and an off gas discharge pipe 33.

The vent pipes 29 & 30 are provided to vent a residual air (ozone) contained in the treated water outlet discharge pipe 28 before the treated water is discharged through the discharge pipe 35.

The discharge pipe 35 is connected to the siphon breaker pipe 34 such to maintain a designated water level 36 in the vessel 19.

The off gas (ozonated air) flows from the vessel 19 into the ozone destruct unit 32 and then to the discharge pipe 35. The ozone destruct unit 32 removes the residual ozone from the off gas.

The coagulation and flocculation system 37 comprises a coagulation recirculation pump 38, a coagulant initial mixing chamber 39, a static mixer 40, an inlet pipe 41 and an outlet pipe 42, and a coagulant supply 43.

The coagulation recirculation pump 38 flow rate is preferably within 10 to 20% to the raw water inlet flow rate.

The coagulant mixing chamber 39 provides an initial, low gradient mixing, and the static mixer 40 provides a final high gradient mixing of the ozonated raw water and a coagulant.

The inlet and outlet pipes 41 & 42 are preferably perforated or slotted to provide a uniform raw water distribution in the vessel 19 and a "plug" like flow through the vessel 19 as indicated by an arrow 25.

Figure 2:
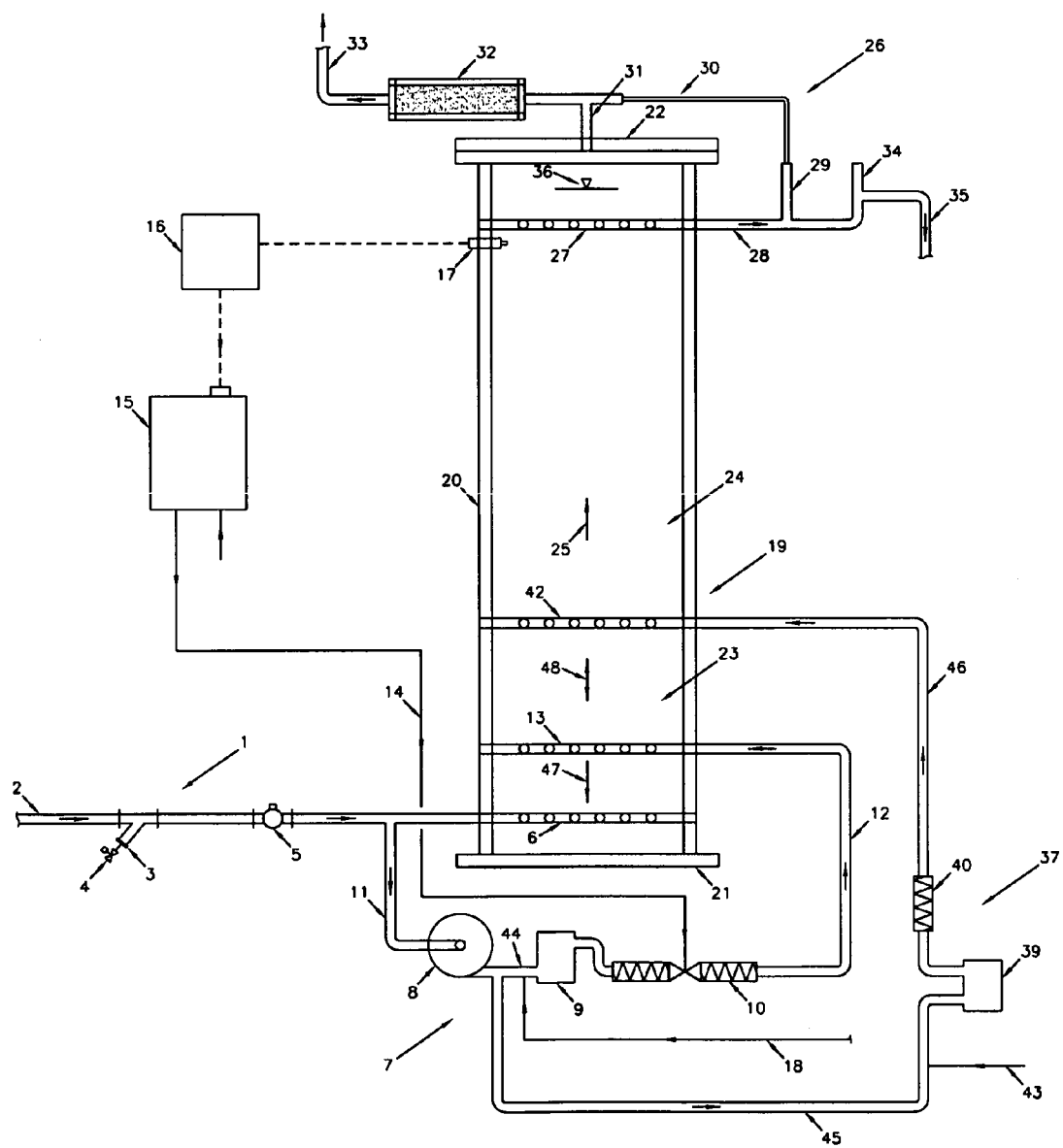
FIG. 2 is a diagrammatic illustration in vertical cross-section of the treatment process and apparatus, in which the oxidation, coagulation and flocculation processes take place in a single vessel and the oxidation and the coagulation and flocculation processes are combined in one system.

A second embodiment of the invention is shown on FIG. 2.

For the various embodiments disclosed here, the same reference numeral numbers are used for the same or substantially similar features. Hence, the raw water inlet piping 1, the oxidation and coagulation and flocculation vessel 19, and the treated water outlet and off gas discharge piping 26 are in essence the same as those shown in FIG. 1.

The oxidation system 7 and the coagulation and flocculation system 37 according to this embodiment are combined and they comprise the same but not all components included in the first embodiment.

The combined oxidation system 7 and the coagulation and flocculation system 37 comprise the recirculation pump 8, the initial chemical mixing chamber 9, the air (ozone) aspirator-mixer 10, the inlet raw water pipe 11, outlet raw water pipes 44 & 45, the ozone generator 15, the ozone in water monitor and ozone in water sensor 16 & 17 respectively, the hydrogen peroxide or other chemical supply 18, the coagulant chemical supply 43, the coagulant initial mixer chamber 39, the static mixer 40, the discharge pipe 42.

The raw water flows into the recirculation pump 8 and it is split into approximately equal streams at the pump discharge; an oxidation stream 44, and a coagulation stream 45.

The recirculation pump 8, in this case, functions as ozonation and coagulation recirculation pump.

The water flow rate into the recirculation pump 8 is approximately twice the raw water flow rate and it consists of the raw water flow from the raw water piping 1 and ozonated water flow from the ozonation vessel 19, preferably, in approximately the same proportion.

The oxidation stream 44 flows through the initial chemical mixing chamber 9 into the air (ozone) aspirator-mixer 10 and the outlet pipe 12 and the discharge pipe 13. The other chemical supply 18 is provided downstream of the initial chemical mixing chamber 9.

The coagulation stream 45 flows into the initial mixing chamber 39, the static mixer 40 and the discharge pipe 46 and the outlet pipe 42. The coagulant supply 43 is provided downstream of the initial mixing chamber 39, and it undergoes an initial low gradient mixing in the mixing chamber 39, and a high gradient mixing in the static mixer 40.

The invention claimed is:

1. A super oxidation, coagulation and flocculation system for treatment of water and wastewater comprises:
   a raw water inlet piping;
   an oxidation system having an inlet pipe attached to the raw water inlet piping, the oxidation system supplies an oxidant to the raw water to produce an oxidant treated water;
   an oxidation, coagulation and flocculation vessel which receives the raw water through from the raw water inlet piping through a first discharge pipe and the oxidant treated water from the oxidation system through a second discharge pipe;
   a coagulation and flocculation system comprising a coagulant supply system, an initial coagulant mixing chamber, a static mixer, and an outlet pipe in the vessel; and
   a treated water outlet and off gas discharge piping system comprising a treated water outlet pipe having a portions inside and outside the vessel, a siphon breaker pipe, a treated water discharge pipe, an off gas outlet pipe, an ozone destruction unit, and an off gas discharge pipe.

2. A treatment system of claim 1 wherein said raw water inlet piping is connected directly to the oxidation system and the oxidation, coagulation and flocculation vessel.

3. A treatment system of claim 1 wherein said oxidation system supplies ozone or ozone and hydrogen peroxide.

4. A treatment system of claim 1 wherein said oxidation system comprises an oxidation recirculation pump, an air aspirator-mixer, an ozone supply system, a second oxidizing chemical supply system, and an initial chemical mixing chamber.

5. A treatment system of claim 4 wherein said oxidation recirculation pump draws water from the raw water inlet piping and from the oxidation, coagulation and flocculation vessel.

6. A treatment system of claim 4 wherein said initial chemical mixing chamber is provided for a thorough mixing of the water with the second oxidizing chemical.

7. A treatment system of claim 4 wherein said oxidation recirculation pump flow rate can be equal to or lower, or higher than the raw water inlet flow rate to provide recirculation of the water through the oxidation system.

8. A treatment system of claim 4 wherein said air aspirator-mixer draws ozone from the ozone supply system, under a vacuum condition, and mixes the drawn ozone with the raw water before the mixture of the raw water and the ozone is discharged to the said oxidation, coagulation and flocculation vessel.

9. A treatment system of claim 1 wherein said coagulation and flocculation system further comprises a coagulation recirculation pump, a coagulant and an inlet pipe in the vessel.

10. A treatment system of claim 9 wherein said inlet and outlet pipes are connected to the said oxidation, coagulation and flocculation vessel in its upper part, to provide adequate retention time for flocculation of the coagulated water inside the vessel.

11. A treatment system of claim 9 wherein said initial coagulant mixing chamber is provided for an initial, low hydraulic gradient mixing of the water and a coagulant with a sufficient retention time to adequately mix the water and the coagulant.

12. A treatment system of claim 9 wherein said static mixer is provided for a high hydraulic gradient mixing of the water and the coagulant.

13. A treatment system of claim 9 wherein said coagulation recirculation pump flow rate is preferably approximately equal to the inlet raw water flow rate.

14. A treatment system of claim 1 wherein said treated water outlet pipe is preferably slotted or perforated inside the vessel on its top to minimize the off gas entry into the pipe.

15. A treatment system of claim 1 wherein said treated water outlet pipe is provided with vent pipes outside of the vessel which allow the off gas carried with the treated water through the outlet pipe to escape to the off gas discharge piping.

16. A treatment system of claim 15 wherein said vent pipes consist of a larger diameter lower vent pipe and a smaller diameter upper vent pipe.

17. A treatment system of claim 16 wherein said larger diameter lower vent pipe allows for an easier escape of the off gas contained in the treated water to the off gas discharge piping.

18. A treatment system of claim 17 wherein said siphon breaker pipe is provided downstream of the said vent pipes on the outlet pipe, and the siphon breaker pipe is vertical and open on top, and it extends approximately to the level of the top of the oxidation, coagulation and flocculation vessel.

19. A treatment system of claim 18 wherein said treated water discharge pipe is connected to the said siphon breaker pipe above the level of the treated water outlet pipe to maintain designated water level inside the oxidation, coagulation and flocculation vessel and to minimize the off gas entry into the treated water outlet pipe inside the vessel.

20. A treatment system of claim 17 wherein said off gas destruct unit collects off gas from the oxidation, coagulation and flocculation vessel and from the vent pipes.

* * * * *